United States Patent
Thangaraj et al.

(10) Patent No.: US 12,307,022 B2
(45) Date of Patent: May 20, 2025

(54) METHOD AND SYSTEM FOR AUTOMATING KEYBOARDS FOR DEVICE TESTING

(71) Applicant: HCL Technologies Limited, New Delhi (IN)

(72) Inventors: Selvaraj Thangaraj, Chennai (IN); Srinivasareddy Vanukuri, Chennai (IN); Siva Sakthivel S, Chennai (IN)

(73) Assignee: HCL Technologies Limited, New Delhi (IN)

( * ) Notice: Subject to any disclaimer, the term of this patent is extended or adjusted under 35 U.S.C. 154(b) by 0 days.

(21) Appl. No.: 18/527,287

(22) Filed: Dec. 3, 2023

(65) Prior Publication Data

US 2025/0130652 A1    Apr. 24, 2025

(30) Foreign Application Priority Data

Oct. 18, 2023   (IN) .............................. 202311071166

(51) Int. Cl.
  *G06F 3/023*   (2006.01)
  *G06F 11/22*   (2006.01)
  *G06F 11/263*  (2006.01)

(52) U.S. Cl.
  CPC .......... *G06F 3/023* (2013.01); *G06F 11/2273* (2013.01); *G06F 11/263* (2013.01)

(58) Field of Classification Search
  CPC ..... G06F 3/023; G06F 11/2273; G06F 11/263
  See application file for complete search history.

(56) References Cited

U.S. PATENT DOCUMENTS

| | | | |
|---|---|---|---|
| 5,576,734 A | 11/1996 | Daniele et al. | |
| 6,018,335 A * | 1/2000 | Onley | G06F 3/023 345/172 |
| 8,117,504 B2 * | 2/2012 | Chang | G06F 11/2221 714/44 |
| 8,683,282 B2 * | 3/2014 | Katz | G06F 11/263 714/741 |
| 2011/0251818 A1 * | 10/2011 | Pei-Ming | G06F 11/2221 702/120 |
| 2012/0136607 A1 * | 5/2012 | Chang | G06F 11/2221 702/108 |

FOREIGN PATENT DOCUMENTS

| | | |
|---|---|---|
| CN | 1591336 A | 3/2005 |
| CN | 200962216 Y | 10/2007 |
| CN | 101241461 A | 8/2008 |
| CN | 101512915 A | 8/2009 |
| TW | I242153 B | 10/2005 |

* cited by examiner

*Primary Examiner* — Kenneth B Lee, Jr.
(74) *Attorney, Agent, or Firm* — Kendal M. Sheets (57) ABSTRACT

This disclosure relates to method and system for automating keyboards for device testing. The method includes receiving a data signal corresponding to a test case for a Device Under Test (DUT) from a computing device based on an automation script. The automation script includes a configuration file corresponding to a keyboard circuit, and the controller is communicatively coupled to the keyboard circuit and the computing device. The method further includes generating a keyboard signal through the keyboard circuit based on the data signal. The method further includes inputting the keyboard signal to the DUT. Further, the method includes capturing a response of the DUT corresponding to the keyboard signal.

8 Claims, 8 Drawing Sheets

METHOD AND SYSTEM FOR AUTOMATING KEYBOARDS FOR DEVICE TESTING

TECHNICAL FIELD

This disclosure relates generally to the field of automation testing, and more particularly to method and system for automating keyboards for device testing.

BACKGROUND

In today's digital era, keyboards or keypads are essential input devices for enabling user interaction with various computing devices such as computers, gaming consoles, and embedded systems. Users are accustomed to using physical keyboards or virtual keyboards for inputting commands and data to the computing devices.

During the testing phase of gaming consoles and embedded devices, keyboard automation is necessary to ensure proper functionality. In the present state of art, software and hardware simulators are commonly employed for this purpose. However, software simulators, when executed in a Device Under Test (DUT), may consume computational resources of the DUT and thus, degrade performance of the application running on the DUT. Hardware simulators, on the other hand, fail to accurately replicate all key events and thus, only a limited functionality of the DUT may be tested.

It is desirable to automate a real keyboard for device testing rather than using simulators to overcome the above-mentioned limitations.

SUMMARY

In one embodiment, a method for automating keyboards for device testing is disclosed. In one example, the method may include receiving, by a controller, a data signal corresponding to a test case for a Device Under Test (DUT) from a computing device based on an automation script. The automation script includes a configuration file corresponding to a keyboard circuit and the controller is communicatively coupled to the keyboard circuit and the computing device. The method may further include generating, by the controller, a keyboard signal through the keyboard circuit based on the data signal. The method may further include inputting, by the keyboard circuit, the keyboard signal to the DUT. The method may further include capturing, by the computing device, a response of the DUT corresponding to the keyboard signal.

In one embodiment, a system for automating keyboards for device testing is disclosed. In one example, the system may include a processor and a memory communicatively coupled to the processor. The memory may store processor-executable instructions, which, on execution, cause the processor to receive, by a controller, a data signal corresponding to a test case for a Device Under Test (DUT) from a computing device based on an automation script. The automation script includes a configuration file corresponding to a keyboard circuit and the controller is communicatively coupled to the keyboard circuit and the computing device. The processor-executable instructions, on execution, may further cause the processor to generate, by the controller, a keyboard signal through the keyboard circuit based on the data signal. The processor-executable instructions on execution may further cause the processor to input, by the keyboard circuit, the keyboard signal to the DUT. The processor-executable instructions, on execution, may further cause the processor to capture, by the computing device, a response of the DUT corresponding to the keyboard signal.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1A:
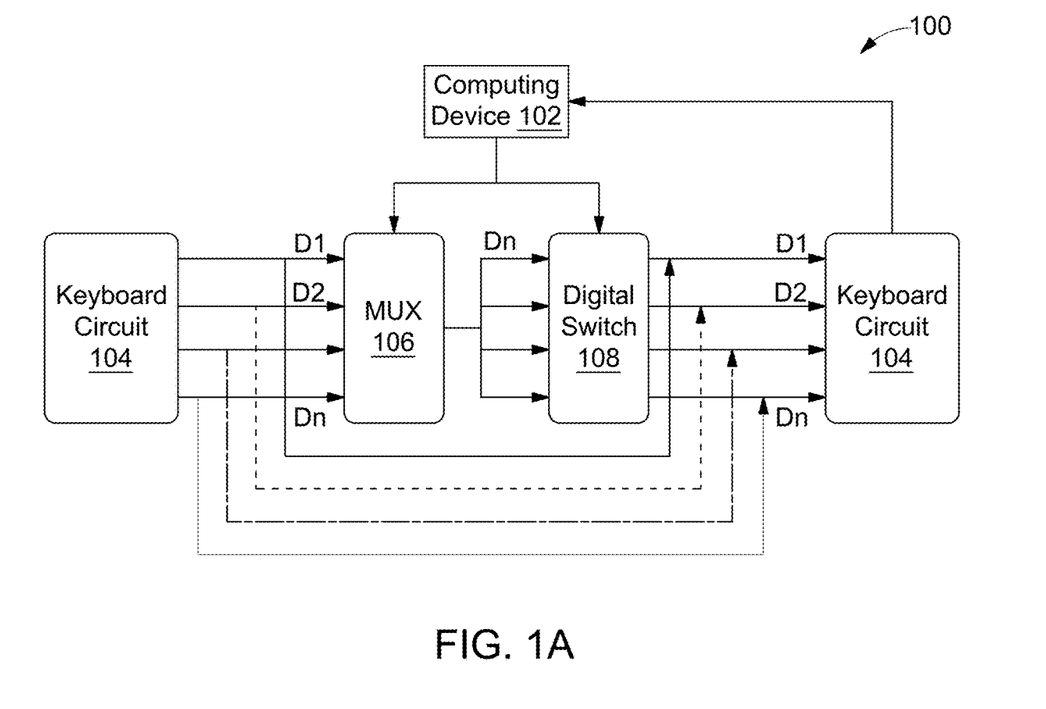
FIG. 1A illustrates a block diagram of an exemplary system for mapping keys of a keyboard circuit, in accordance with some embodiments.

Referring now to FIG. 1A, a block diagram of an exemplary system 100 for mapping keys of a keyboard circuit is illustrated, in accordance with some embodiments. The system 100 may include a computing device 102 (for example, desktop, laptop, notebook, netbook, tablet, smartphone, mobile phone, or any other computing device), in accordance with some embodiments of the present disclosure. The computing device 102 may be communicatively coupled to a keyboard circuit 104, a Multiplexer (Mux) 106, and a digital switch 108.

The keyboard circuit 104 may be a wired matrix that includes a plurality of rows of electrically conductive wires in contact with a plurality of columns of electrically conductive wires. This is explained further in greater detail in conjunction with FIG. 1B. The keyboard circuit 104 may be communicatively coupled with the digital switch 108. Further, a plurality of digital lines ($D_1, D_2, \ldots, D_n$) corresponding to the plurality of rows and the plurality of columns of the keyboard circuit 104 may be communicatively coupled to the Mux 106. Additionally, the Mux 106 may be communicatively coupled to the digital switch 108.

The Mux 106 of the system 100 may be a data selector which may select between a plurality of analog input signals or a plurality of digital input signals and render a single output analog signal or a single output digital signal based on instructions (i.e., control signals) received from the computing device 102. In an embodiment, the Mux 106 of the system 100 may select one line ($D_x$) from the plurality of digital lines ($D_1, D_2, \ldots, D_n$) based on the control signals. By way of an example, when the Mux 106 receives 5 input digital lines, i.e., ($D_1, D_2, D_3, D_4$, and $D_5$), the Mux 106 may select one digital line from the 5 input digital lines. Further, an output of the Mux 106 (i.e., $D_x$) may be connected to the digital switch 108 which may be controlled by the computing device 102.

Further, output of the digital switch 108 (i.e., $D_x$) and input signal of the Mux 106 (i.e., the plurality of digital lines ($D_1, D_2, \ldots, D_n$)) may be shorted one to one. In some embodiments, when the Digital Switch 108 is activated in a sequential way, the output of the Mux 106 received by the Digital Switch 108 may be shorted with each of the plurality of digital lines ($D_1, D_2, \ldots, D_n$) of the keyboard circuit 104. Further, the computing device 102 may include a display which may render a keycode of the pressed key of the keyboard circuit 104. Alternatively, and particularly when the keyboard circuit 104 corresponds to a keyboard device, the display of the computing device 102 may render a notepad and a character corresponding to the pressed key of the keyboard circuit 104 may be typed. Further, the computing device 102 may capture a response of the keyboard circuit 104 for each switch activation.

In an embodiment, the computing device 102 may include a configuration file. The configuration file may be included in the automation script or may be stored as a separate file in the computing device 102. In an embodiment, the computing device 102 may retrieve the automation script or the configuration file from a database. The configuration file may include a mapping of a key code/key character of the keyboard circuit 104 and digital lines to be shorted to generate a keyboard signal corresponding to the key code/key character. In some embodiments, the configuration file may also include a time duration of the shorting. By way of an example, the configuration file may include the mapping in the format as below:

$D_1, D_3$ - - - A
$D_2, D_3$ - - - a

Here, to automate keypress of a key character 'A' the digital lines $D_1$ and $D_3$ may be shorted, and to automate keypress of a key character 'a' the digital lines $D_2$ and $D_3$ may be shorted.

Figure 1B:
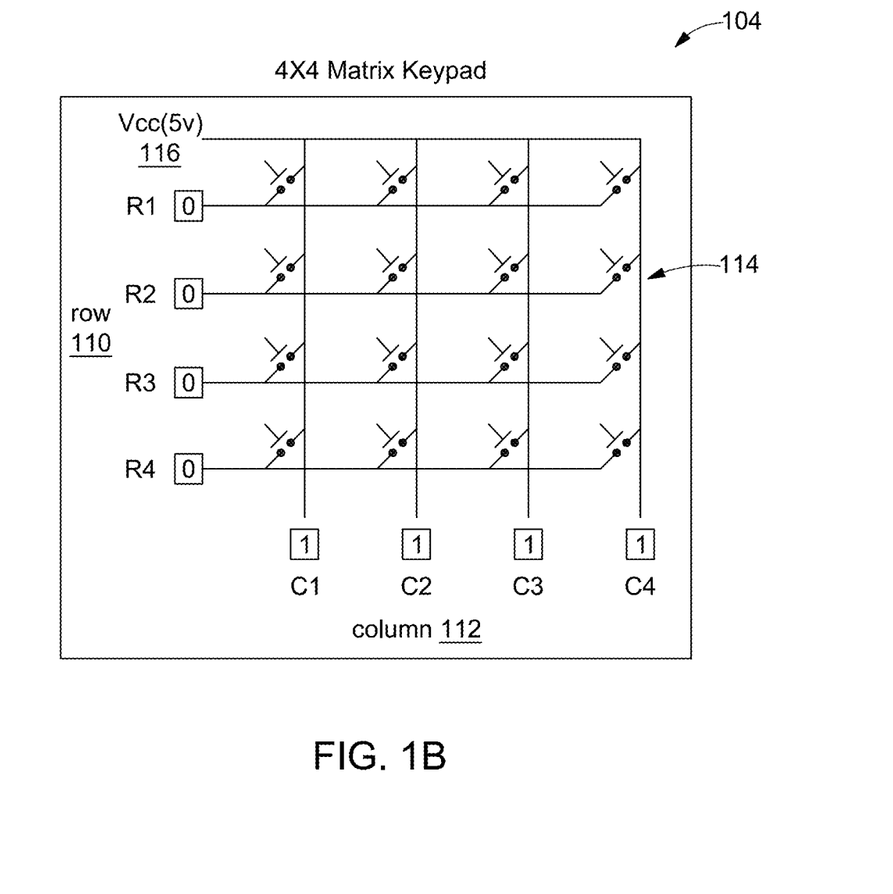
FIG. 1B illustrates an exemplary keyboard circuit of the system of FIG. 1A, in accordance with some embodiments.

Referring now to FIG. 1B, an exemplary keyboard circuit 104 of the system 100 is illustrated, in accordance with some embodiments. FIG. 1B Is explained in conjunction with FIG. 1A. The keyboard circuit 104 may include the plurality of rows 110 and the plurality of columns 112 of electrically conductive wires forming the plurality of digital lines which may be shorted to generate keyboard signals corresponding to key codes/key characters. In some embodiments, the plurality of rows 110 and the plurality of columns 112 may be arranged in a wired matrix in a way that the digital lines of the plurality of rows 110 of the keyboard circuit 104 are in contact with the digital lines of the plurality of columns 112 of the keyboard circuit 104 via a plurality of switches. Further, the plurality of rows 110 and the plurality of columns 112 may be shorted by activating a corresponding switch 114 of the keyboard circuit 104. The keyboard circuit 104 may also include a voltage digital line 116 to power the keyboard circuit 104. The voltage digital line 116 may be a 5V direct current (DC) line connected to the plurality of columns 112 of the keyboard circuit 104.

In some embodiments, the plurality of rows 110 may act as an output from a controller. This is explained in detail in conjunction with FIG. 2. The plurality of columns 112 may act as input pins which may receive the input from a user. By way of an example, when one of the plurality of switches of the keyboard circuit 104 is activated (e.g., the switch 114), the corresponding row and column may be shorted and the controller may read the column input and the row output to determine the key code/key character.

Figure 2:
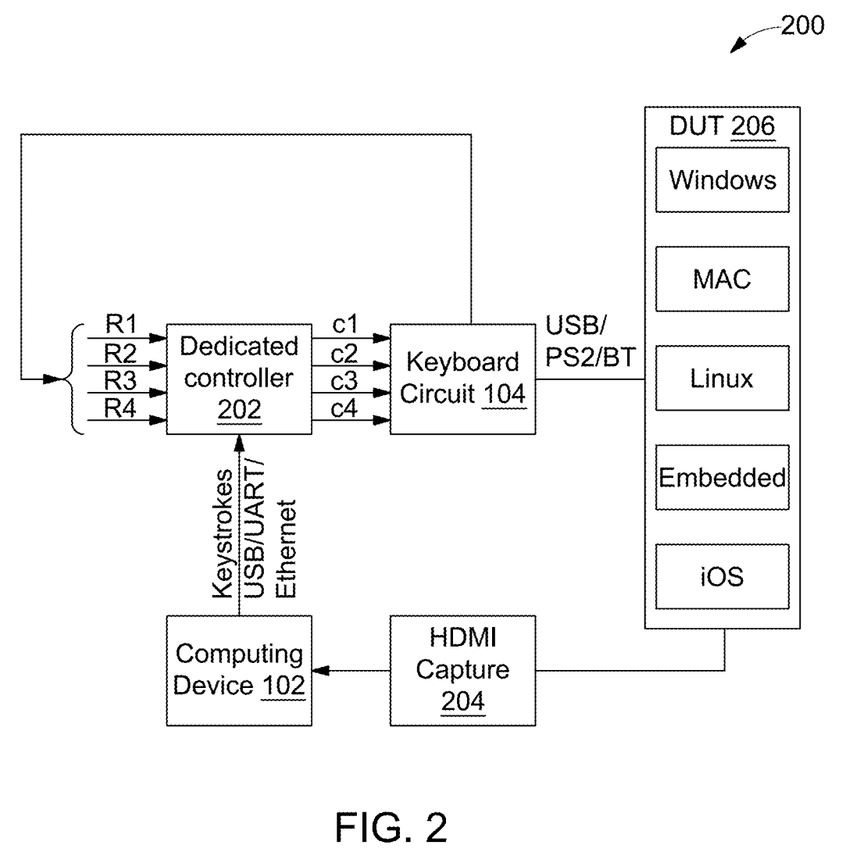
FIG. 2 illustrates an exemplary system for automating a keyboard for device testing, in accordance with some embodiments.

Referring now to FIG. 2, an exemplary system 200 for automating a keyboard for device testing is illustrated, in accordance with some embodiments. FIG. 2 Is explained in conjunction with FIGS. 1A-B. The system 200 includes the computing device 102, the keyboard circuit 104, a controller 202, a HDMI capture 204 and a Device Under Test (DUT) 206. In some embodiments, an automation script includes instructions, which when executed by the computing device 102, may automate the keyboard circuit 104 for testing a Device Under Test (DUT) 206. The DUT 206 may be, but not limited to, a computing device including an Operating System (OS) such as, but not limited to, windows, mac, Linux, iOS, or any other embedded OS. The automation script may be created in a scripting language such as, but not limited to, python, java, C #, PowerShell, or the like.

In some embodiments, the controller 202 may be a microcontroller/microprocessor or a logic circuit. The logic circuit may be a flip flop, buffer, or Field Programmable Gate Arrays (FPGA). The controller 202 of the system 200 may short the row and the column of the keyboard circuit 104 to execute the automation script on the DUT 206. The controller 202 may take user input corresponding to the row of the keyboard circuit 104 and short the row with the column to generate a key code/key character. In some embodiments, the controller 202 may include a system for automating the keyboard circuit 104 for single keystroke as explained in detail in FIG. 5. The controller 202 may include a system for automating the keyboard circuit 104 for multiple keystrokes as explained in detail in FIG. 6.

In an embodiment, during the execution of the automation script, the user input may be parsed by the controller 202. Further, the digital lines of at least one of the plurality of the rows may be shorted with the digital lines of at least one of the plurality of the columns of the keyboard circuit 104 based on the configuration file. The computing device 102 may send commands to the controller 202 to short the digital lines of the plurality of rows and the digital lines of the plurality of columns based on the required user input from the automation script. The time duration of shorting may be taken from the configuration file. It should be noted that the time duration of shorting is a time for which the row and the column in the keyboard circuit 104 may be shorted.

In some embodiments, the controller 202 may receive a data signal corresponding to a test case for a Device Under Test (DUT) from a computing device based on an automation script. The automation script includes a configuration file corresponding to the keyboard circuit. Further, the controller 202 may generate a keyboard signal through the keyboard circuit based on the data signal.

In some embodiments, the keyboard circuit 104 of the system 200 may input the keyboard signal to the DUT. The keyboard signal may correspond to a single keystroke or a plurality of keystrokes. Further, the computing device 102 may capture a response of the DUT corresponding to the keyboard signal.

As will be appreciated by one skilled in the art, a variety of processes may be employed for automating keyboards for device testing. For example, the exemplary system 200 and the associated computing device 102 may automate keyboards for device testing by the processes discussed herein. In particular, as will be appreciated by those of ordinary skill in the art, control logic and/or automated routines for performing the techniques and steps described herein may be implemented by the system 200 and the associated computing device 102 either by hardware, software, or combinations of hardware and software. For example, suitable code may be accessed and executed by the one or more processors on the system 200 to perform some or all of the techniques described herein. Similarly, application specific integrated circuits (ASICs) configured to perform some, or all of the processes described herein may be included in the one or more processors on the system 200.

Figure 3:
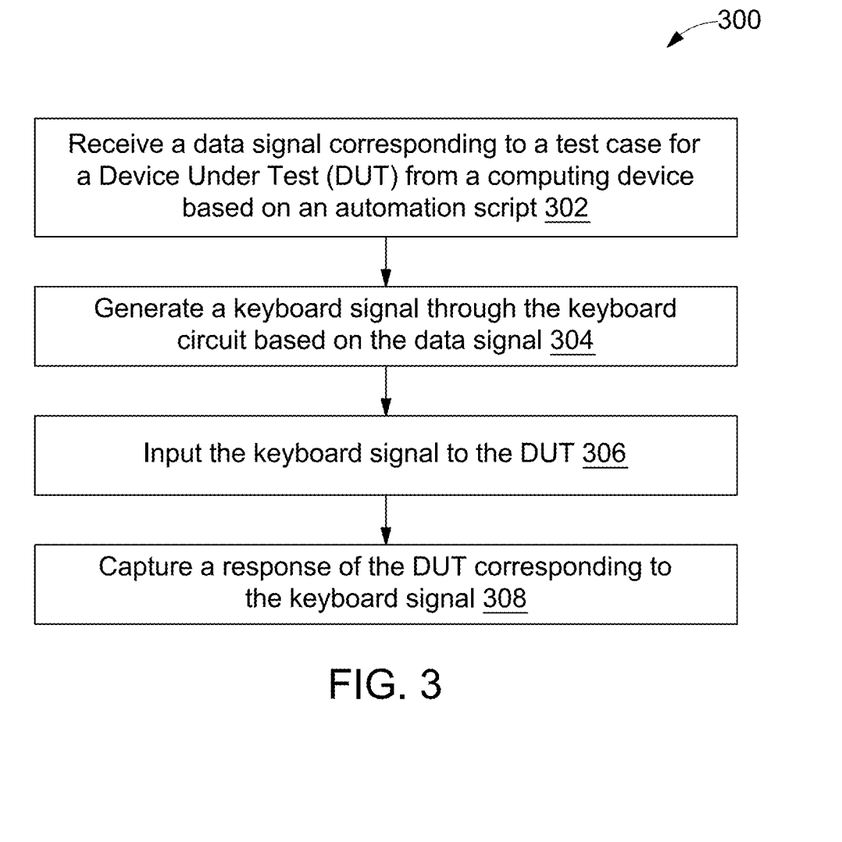
FIG. 3 illustrates a flowchart of an exemplary process for automating a keyboard for device testing, in accordance with some embodiments.

Referring now to FIG. 3, an exemplary process 300 for automating a keyboard for device testing is depicted via a flowchart, in accordance with some embodiments. FIG. 3 is explained in conjunction with the FIGS. 1A-B and 2. In an embodiment, the process 300 may be implemented by the system 200. In some embodiments, the process 300 may include creating, by the computing device 102, the automation script based on a user input. In some embodiments, the process 300 may include mapping, by the computing device 102, the plurality of points of contact with a plurality of keys of the keyboard.

The mapping of the plurality of points of contact may include receiving, by the mux 106, a first control signal from the computing device 102 and a plurality of input digital lines from the keyboard circuit 104. The plurality of input digital lines may include the plurality of rows and the plurality of columns (e.g., the plurality of rows 110 and the plurality of columns 112). Each of the plurality of rows and each of the plurality of columns may be connected to the mux 106. Further, the mapping may include outputting, by the mux 106, a digital line from the plurality of input digital lines based on the control signals to a digital switch 108. The digital switch 108 is connected to the mux 106 and the computing device 102. Further, the mapping may include generating, by the digital switch 108, a first key signal corresponding to the digital line based on a second control signal received from the computing device 102. Further, the mapping may include shorting each of remaining of the plurality of input digital lines with the first key signal to obtain a keyboard signal. Further, the mapping may include obtaining, by the computing device 102, a response corresponding to the keyboard signal. Further, the mapping may include mapping, by the computing device 102, the plurality of points of contact with the plurality of keys of the keyboard based on the response. Further, the process 300 may include creating the configuration file corresponding to the keyboard circuit based on the mapping.

The process 300 may include receiving, by the controller 202, a data signal corresponding to a test case for a DUT (e.g., the DUT 206) from the computing device 102 based on an automation script, at step 302. The automation script includes the configuration file corresponding to a keyboard circuit. The controller 202 is communicatively coupled to the keyboard circuit 104 and the computing device 102.

Further, the process 300 may include generating, by the controller 202, a keyboard signal through the keyboard circuit 104 based on the data signal, at step 304. In an embodiment, the generation of the keyboard signal may include receiving, by the mux 106, a third control signal from the computing device 102 based on the automation script and a plurality of input row signals from the plurality of rows 110 of the keyboard circuit 104. The mux 106 is communicatively coupled with the computing device 102 and with each of the plurality of rows 110 and each of the plurality of columns 112 of the keyboard circuit 104. Further, the generation of the keyboard signal may include outputting, by the mux 106, a row signal from the plurality of input row signals based on the third control signal. The generation of the keyboard signal may further include triggering, by the computing device 102, a column signal corresponding to a column 112 of a key based on the automation script. Further, the generation of the keyboard signal may include shorting the row signal with the column signal to generate the keyboard signal through the keyboard circuit 104.

In another embodiment, the generation of keyboard signal may include receiving, by a mux 106, a fourth control signal from the computing device 102 based on the automation script at least one input row signal from the plurality of rows 110 of the keyboard circuit 104. The mux 106 is communicatively coupled with the computing device 102 and with each of the plurality of rows 110 and each of the plurality of columns 112 of the keyboard circuit 104. For each of the at least one row signal, the generation of keyboard signal may include triggering, by the computing device 102, a column signal corresponding to a column 112 of a key based on the automation script. Further, the generation of keyboard signal may include shorting the row signal with the column signal to generate the keyboard signal through the keyboard circuit 104.

Further, the process 300 may include inputting the keyboard signal to the DUT, at step 306. Further, the process 300 includes capturing a response of the DUT corresponding to the keyboard signal, at step 308.

Figure 4:
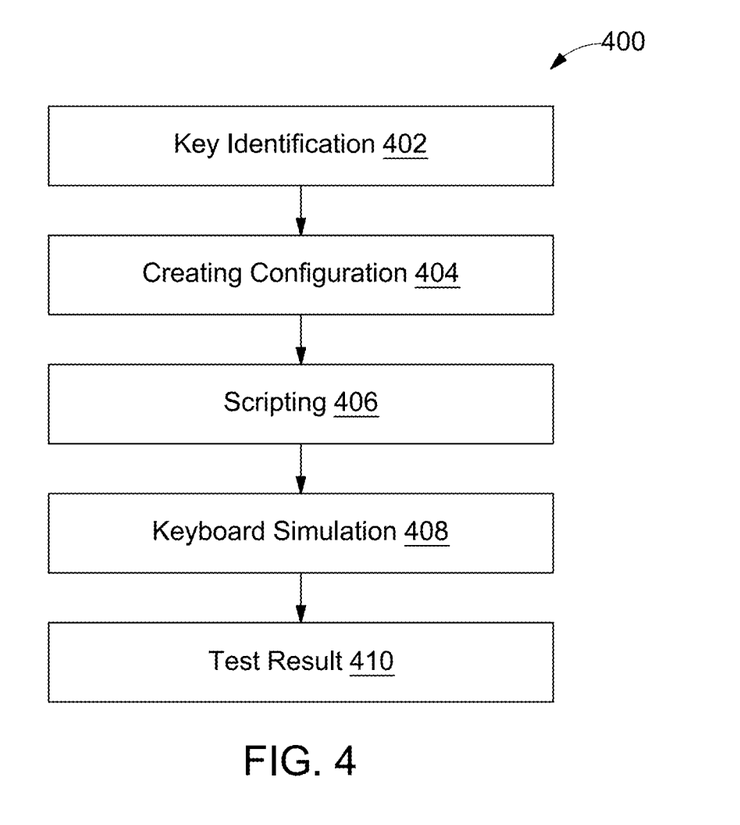
FIG. 4 illustrates a flowchart of a detailed exemplary process for automating a keyboard for device testing, in accordance with some embodiments.

Referring now to FIG. 4, an exemplary process 400 for automating a keyboard for device testing is depicted via a flowchart, in accordance with some embodiments. FIG. 4 is explained in conjunction with FIGS. 1A-B, 2, and 3. In an embodiment, the process 400 may be implemented by the system 200. The process 400 may include identifying the plurality of rows and the plurality of columns for each key of the keyboard circuit 104, at step 402. Further, the process 400 may include creating a configuration file which may include mapping of each row of the plurality of rows and each column of the plurality of columns, at step 404.

Further, the process 400 may include developing an automation script for user inputs using the keyboard simulator, at step 406. The process 400 may further include simulating the keyboard based on the developed script and the configuration file, at step 408. The process 400 may include rendering the test results of the DUT on a display or a device, at step 410. The response of DUT for the user input may be verified by the computing device 102, upon capturing the response of the DUT. The response may be in the form of User interface (UI) change, or an audio, or a video.

Figure 5:
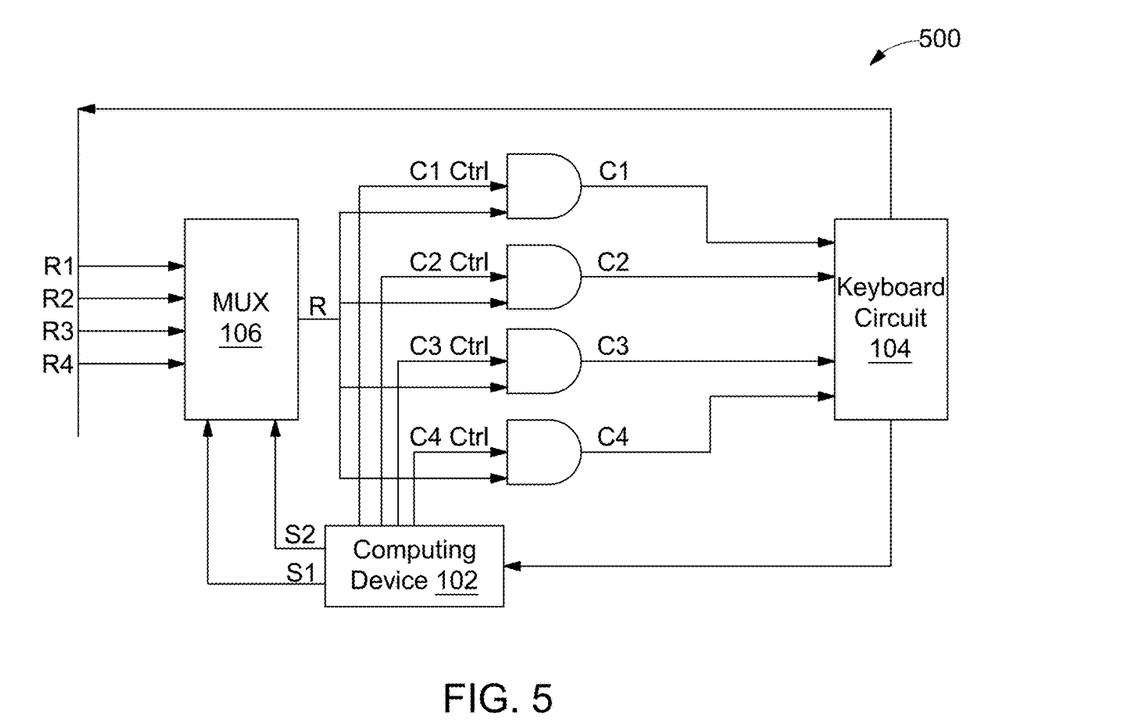
FIG. 5 illustrates an exemplary system for automating single keystrokes of a keyboard for device testing, in accordance with some embodiments.

Referring now to FIG. 5, an exemplary system for automating a keyboard for device testing is illustrated, in accordance with some embodiments. FIG. 5 Is explained in conjunction with FIGS. 1A-B, 2, 3, and 4. Further, a plurality of logic gates 502 of the system 500 may be analogous to the controller 202 of the system 200. The plurality of logic gates 502 of the system 500 may be a plurality of "AND" logic gates which may short the plurality of rows 110 and the plurality of columns 112 of the keyboard circuit 104.

In some embodiments, the computing device 102 may send a plurality of control signals to the MUX 106 to select digital line of one row from the plurality of rows of the keyboard circuit 104. The plurality of control signals may include a first control signal and a second control signal which may be received by the MUX 106 to determine the required row to be shorted with the required column. Further, the digital line of at least one column from the plurality of columns may be shorted with the digital line of row based on the character to be simulated.

In some embodiments, the plurality of logic gates 502 may receive a row selected by the MUX 106 based on the automation script and the user input from the plurality of the rows of the keyboard circuit 104. The plurality of logic gates 502 may also receive a digital line of each of the column of the plurality of columns. The plurality of logic gates 502 may then short the required column with the row to simulate the required character based on the automation script and the configuration file.

In some embodiments, the exemplary system 500 may generate a keyboard signal corresponding to a single keystroke through the keyboard circuit. The exemplary system 500 may include the mux 106 that may be configured to receive a third control signal from the computing device 102 based on the automation script and the plurality of input row signals from the plurality of rows 110 of the keyboard circuit 104. The mux 106 is communicatively coupled with the computing device 102 and with each of the plurality of rows 110 and each of the plurality of columns 112 of the keyboard circuit 104.

Further, the mux 106 may be configured to produce the output of the row signal from the plurality of input row signals based on the third control signal. In some embodiments, the exemplary system 500 may include the computing device 102 which may be configured to trigger a column signal corresponding to a column corresponding to a key based on the automation script. Further, the computing device 102 may short the row signal with the column signal to generate the keyboard signal through the keyboard circuit 104.

Figure 6:
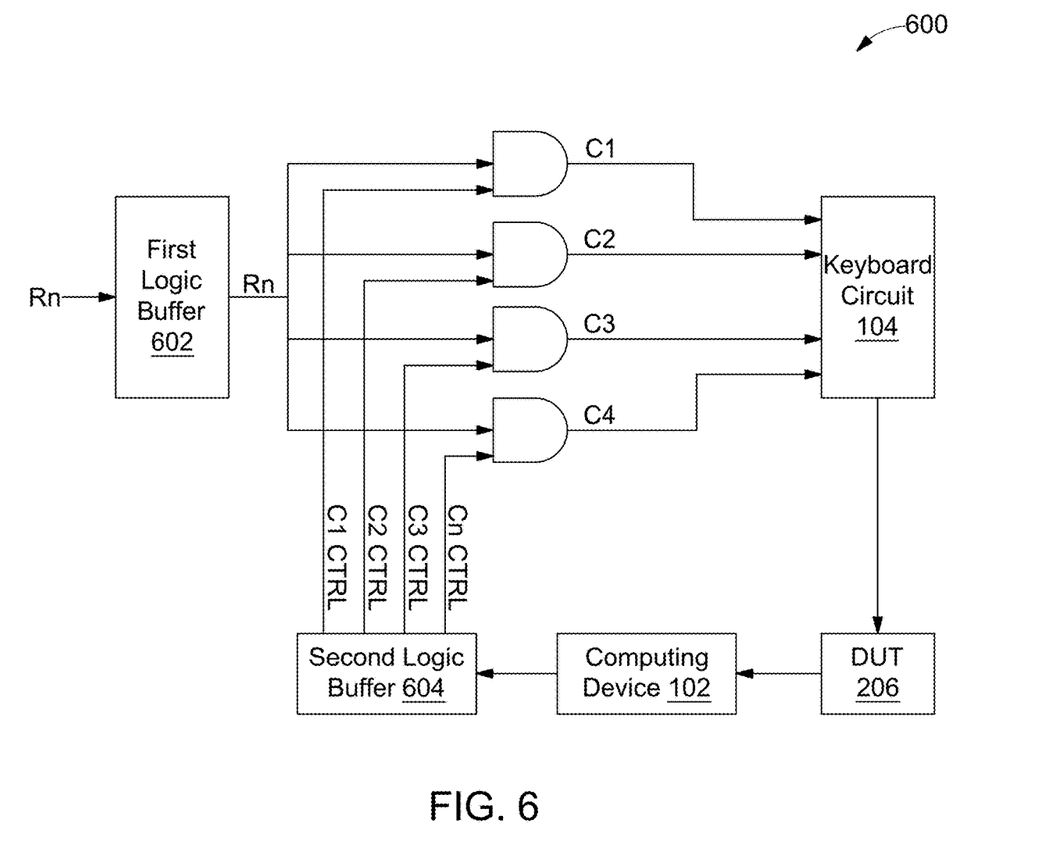
FIG. 6 illustrates an exemplary system for automating multiple keystrokes of a keyboard for device testing, in accordance with some embodiments.

Referring now to FIG. 6, an exemplary system for automating a keyboard for device testing is illustrated, in accordance with some embodiments. FIG. 6 Is explained in conjunction with FIGS. 1A-B, 2, 3, 4, and 5. In some embodiments, the plurality of the logic gates 502 of the system 600 may be analogous to the plurality of the logic gates 502 of the system 500. Further, the system 600 may include a first logic buffer 602 and a second logic buffer 604. The logic buffer may be a logic gate that receives one input and generates one output. By way of an example, the logic buffer may compare the input signal to 0. If the input signal is zero, the output will be zero. If the input is non-zero, the output will be a "1".

In some embodiments, the first logic buffer 602 is communicatively coupled with the plurality of logic gates 502 and the keyboard circuit 104. The first logic buffer 602 may receive the digital lines corresponding to the plurality of rows 110 of the keyboard circuit 104. The second logic buffer 604 may be communicatively coupled to the computing device 102 and the plurality of the logic gates 502. Each of the plurality of logic gates 502 may receive a unique column digital line via the second logic buffer 604. In an embodiment, each of the row digital line may include a similar circuit as described in the system 600. Each of the digital lines corresponding to the plurality of rows 110 may be activated separately to generate a single keystroke as explained in FIG. 5. Further, the row digital lines may be activated in combination with at least two row digital lines to generate multiple keystrokes.

In some embodiments, the exemplary system 600 may generate a keyboard signal corresponding to multiple keystrokes through the keyboard circuit 104. The exemplary system 500 may include the mux 106 that may be configured to receive a fourth control signal from the computing device 102 based on the automation script at least one input row signal from the plurality of rows 110 of the keyboard circuit 104. The mux 106 is communicatively coupled with the computing device 102 and with each of the plurality of rows 110 and each of the plurality of columns 110 of the keyboard circuit 104.

In an embodiment, for each of the at least one row signal, the computing device 102 may trigger a column signal corresponding to a column 112 of a key based on the automation script. Further, the computing device 102 may short the row signal with the column signal to generate the keyboard signal through the keyboard circuit 104.

Figure 7:
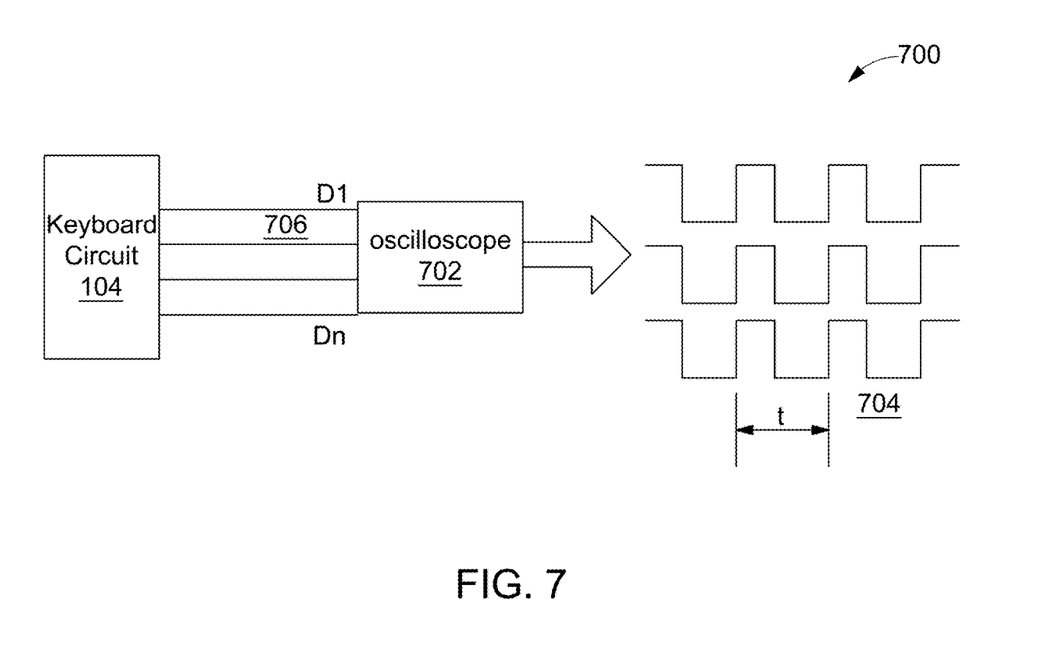
FIG. 7 illustrates an exemplary system to determine a scan rate of a keyboard circuit, in accordance with some embodiments.

Referring now to FIG. 7, an exemplary system to determine a scan rate of the keyboard circuit is illustrated, in accordance with some embodiments. The system 700 may include an oscilloscope 702 to determine the scan rate of the keyboard circuit 104. The scan rate of the keyboard is the measure of how frequently the keyboard update the internal state of its key matrix. The key matrix include the plurality of rows, and the plurality of columns as explained in detail in FIG. 1B.

In some embodiments, the digital lines 706 of the plurality of columns and the digital lines 706 of the plurality of rows $(D_1, D_2, \ldots, D_n)$ may be in ON state for a time period and in OFF state for a time period. The time period or frequency between the ON state and the OFF state of the digital lines 706 may be calculated using the oscilloscope 702 of the system 700. The oscilloscope 702 is communicatively coupled with the keyboard circuit 104. In some embodiments, the oscilloscope 702 may also render a graphical representation of the ON state and the OFF state of the digital lines of the keyboard circuit 104.

In some embodiments, the graphical representation of the ON state and the OFF state of the digital lines of the keyboard circuit 104 may be in form of a graph 704 plotted as a digital line signal value vs time. The digital line signal value may be plotted on the y-axis and the time may be plotted on the x-axis. The graph 704 may include highs formed due to the ON state of the digital lines 706, and lows formed due to the OFF state of the digital lines 706. In simpler words, the time taken to form a high and the consecutive low may be termed as the scan rate of the keyboard circuit 104. In an embodiment, the high may corresponds to the highest value of the digital line signal may be "1" and the low corresponds to the lowest value of the digital line signal may be "0".

Thus, the disclosed method and system try to overcome the technical problem of automating the keyboard for device testing. The method and system provide means to automate the keyboard for testing the plurality of devices. Further, the method and system may provide a method to automate any real or virtual keyboard. Further, the method and system provide a method to automate device testing which may include testing of gaming consoles or computing devices running software on various OS platforms such as, windows, Linux, MacOS, etc. Further, the method and system may provide a method to render the test results of the DUT on a computer screen or any other computing device screen.

As will be appreciated by those skilled in the art, the techniques described in the various embodiments discussed above are not routine, or conventional, or well understood in the art. The techniques discussed above provide for automating the keyboards for device testing. The techniques first receive a data signal corresponding to a test case for a Device Under Test (DUT) from a computing device based on an automation script. The automation script includes a configuration file corresponding to a keyboard circuit, and the controller is communicatively coupled to the keyboard circuit and the computing device. The techniques then generate a keyboard signal through the keyboard circuit based on the data signal. The techniques then input the keyboard signal to the DUT. The techniques then capture a response of the DUT corresponding to the keyboard signal.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for automating keyboards for device testing. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for automating keyboards for device testing, the method comprising:
mapping, by a computing device, a plurality of points of contact of a keyboard circuit with a plurality of keys of a keyboard; wherein the mapping comprises:
receiving, by a multiplexer (mux), a first control signal from the computing device and a plurality of input digital lines from the keyboard circuit, wherein the plurality of input digital lines comprises a plurality of rows and a plurality of columns, and wherein each of the plurality of rows and each of the plurality of columns is connected to the mux;
outputting, by the mux, a digital line from the plurality of input digital lines based on the first control signal to a digital switch, wherein the digital switch is connected to the mux and the computing device;
generating, by the digital switch, a first key signal corresponding to the digital line based on a second control signal received from the computing device;
shorting each of remaining of the plurality of input digital lines with the first key signal to obtain a keyboard signal;
obtaining, by the computing device, a response corresponding to the keyboard signal; and
mapping, by the computing device, the plurality of points of contact with the plurality of keys of the keyboard based on the response;
creating a configuration file corresponding to the keyboard circuit based on the mapping;
receiving, by a controller, a data signal corresponding to a test case for a Device Under Test (DUT) from a computing device based on an automation script, wherein the automation script comprises the configuration file corresponding to the keyboard circuit, and wherein the controller is communicatively coupled to the keyboard circuit and the computing device;
generating, by the controller, a keyboard signal through the keyboard circuit based on the data signal;
inputting, by the keyboard circuit, the keyboard signal to the DUT; and
capturing, by the computing device, a response of the DUT corresponding to the keyboard signal.

2. The method of claim 1, further comprising creating, by the computing device, the automation script based on a user input.

3. The method of claim 1, wherein generating the keyboard signal through the keyboard circuit comprises:
receiving, by a mux, a third control signal from the computing device based on the automation script and a plurality of input row signals from the plurality of rows of the keyboard circuit, wherein the mux is communicatively coupled with the computing device and with each of the plurality of rows and each of the plurality of columns of the keyboard circuit;
outputting, by the mux, a row signal from the plurality of input row signals based on the third control signal;
triggering, by the computing device, a column signal corresponding to a column of a key based on the automation script; and
shorting the row signal with the column signal to generate the keyboard signal through the keyboard circuit.

4. The method of claim 1, wherein generating the keyboard signal through the keyboard circuit comprises:
receiving, by a mux, a fourth control signal from the computing device based on the automation script at least one input row signal from the plurality of rows of the keyboard circuit, wherein the mux is communicatively coupled with the computing device and with each of the plurality of rows and each of the plurality of columns of the keyboard circuit; and for each of the at least one row signal,
triggering, by the computing device, a column signal corresponding to a column of a key based on the automation script; and
shorting the row signal with the column signal to generate the keyboard signal through the keyboard circuit.

5. A system for automating keyboards for device testing, the system comprising:
a processor; and
a memory communicatively coupled to the processor, wherein the memory stores processor-executable instructions, which, on execution, cause the processor to:
map a plurality of points of contact of a keyboard circuit with a plurality of keys of a keyboard; wherein the mapping comprises:
receiving a first control signal from the computing device and a plurality of input digital lines from the keyboard circuit by a multiplexer (mux), wherein the plurality of input digital lines comprises a plurality of rows and a plurality of columns, and wherein each of the plurality of rows and each of the plurality of columns is connected to the mux;
outputting a digital line from the plurality of input digital lines based on the first control signal to a digital switch by the mux, wherein the digital switch is connected to the mux and the computing device;
generating a first key signal corresponding to the digital line based on a second control signal received from the computing device;
shorting each of remaining of the plurality of input digital lines with the first key signal to obtain a keyboard signal;
obtaining a response corresponding to the keyboard signal; and
mapping the plurality of points of contact with the plurality of keys of the keyboard based on the response;
create a configuration file corresponding to the keyboard circuit based on the mapping;
receive a data signal corresponding to a test case for a Device Under Test (DUT) from a computing device based on an automation script, wherein the automation script comprises the configuration file corresponding to a keyboard circuit, and wherein the controller is communicatively coupled to the keyboard circuit and the computing device;
generate a keyboard signal through the keyboard circuit based on the data signal;
input the keyboard signal to the DUT; and
capture a response of the DUT corresponding to the keyboard signal.

6. The system of claim 5, wherein the processor-executable instructions further cause the processor to create the automation script based on a user input.

7. The system of claim 5, wherein to generate the keyboard signal through the keyboard circuit, the processor-executable instructions cause the processor to:
receive a third control signal from the computing device based on the automation script and a plurality of input row signals from the plurality of rows of the keyboard circuit, wherein the mux is communicatively coupled with the computing device and with each of the plurality of rows and each of the plurality of columns of the keyboard circuit;
output a row signal from the plurality of input row signals based on the third control signal;
trigger a column signal corresponding to a column of a key based on the automation script; and
short the row signal with the column signal to generate the keyboard signal through the keyboard circuit.

8. The system of claim 5, wherein to generate the keyboard signal through the keyboard circuit, the processor-executable instructions cause the processor to:
receive a fourth control signal from the computing device based on the automation script at least one input row signal from the plurality of rows of the keyboard circuit, wherein the mux is communicatively coupled with the computing device and with each of the plurality of rows and each of the plurality of columns of the keyboard circuit; and
for each of the at least one row signal,
trigger a column signal corresponding to a column of a key based on the automation script; and
short the row signal with the column signal to generate the keyboard signal through the keyboard circuit.

* * * * *